US010821385B2

(12) United States Patent
Schwartz et al.

(10) Patent No.: US 10,821,385 B2
(45) Date of Patent: Nov. 3, 2020

(54) AIR FILTER ARRANGEMENT

(71) Applicant: Cummins Filtration IP, Inc., Columbus, IN (US)

(72) Inventors: Scott W. Schwartz, Cottage Grove, WI (US); Peter K. Herman, Stoughton, WI (US); Jeremiah Cupery, Madison, WI (US); Mark A. Terres, Shakopee, MN (US)

(73) Assignee: Cummins Filtration IP, Inc., Columbus, IN (US)

( * ) Notice: Subject to any disclaimer, the term of this patent is extended or adjusted under 35 U.S.C. 154(b) by 290 days.

(21) Appl. No.: 15/751,248

(22) PCT Filed: Aug. 11, 2016

(86) PCT No.: PCT/US2016/046564
§ 371 (c)(1),
(2) Date: Feb. 8, 2018

(87) PCT Pub. No.: WO2017/034819
PCT Pub. Date: Mar. 2, 2017

(65) Prior Publication Data
US 2018/0229170 A1  Aug. 16, 2018

Related U.S. Application Data

(60) Provisional application No. 62/209,162, filed on Aug. 24, 2015.

(51) Int. Cl.
*B01D 53/02* (2006.01)
*B01D 46/00* (2006.01)
*B01D 46/52* (2006.01)

(52) U.S. Cl.
CPC ....... *B01D 46/0005* (2013.01); *B01D 46/009* (2013.01); *B01D 46/528* (2013.01);
(Continued)

(58) Field of Classification Search
CPC .......... B01D 2265/02; B01D 2265/026; B01D 2265/06; B01D 2271/022;
(Continued)

(56) References Cited

U.S. PATENT DOCUMENTS 5,128,034 A  7/1992  Kool
6,006,924 A  12/1999  Sandford
(Continued)

FOREIGN PATENT DOCUMENTS

CN   103566638 A   2/2014

OTHER PUBLICATIONS

International Search Report and Written Opinion issued for PCT/US2016/046564 dated Oct. 26, 2016, 7 pages.
(Continued)

Primary Examiner — Christopher P Jones
(74) Attorney, Agent, or Firm — Foley & Lardner LLP

(57) ABSTRACT

Filter housings that have housing wall surface irregularities are described. The surface irregularities are positioned on the inner walls of the housings and/or axial ends of the housing walls. The surface irregularities may be, for example, grooves, ribs, bumps, and the like. The surface irregularities provide an engine integrity protection (EIP) feature by preventing non-approved replacement filter elements from forming seals against alternative sealing surfaces of the housing wall inner surfaces or axial ends.

8 Claims, 10 Drawing Sheets

(52) U.S. Cl.
CPC .... *B01D 2265/02* (2013.01); *B01D 2265/026* (2013.01); *B01D 2265/06* (2013.01); *B01D 2271/022* (2013.01); *B01D 2271/027* (2013.01); *B01D 2279/60* (2013.01)

(58) Field of Classification Search
CPC .......... B01D 2271/027; B01D 2279/60; B01D 46/0005; B01D 46/009; B01D 46/528
See application file for complete search history.

(56) References Cited

U.S. PATENT DOCUMENTS

| | | | |
|---|---|---|---|
| 6,615,990 B1* | 9/2003 | Jokschas | B01D 29/21 210/450 |
| 7,988,757 B2* | 8/2011 | Scott | B01D 46/0001 55/498 |
| 9,314,721 B2* | 4/2016 | Kaufmann | B01D 35/30 |
| 9,724,627 B2 | 8/2017 | Malgorn et al. | |
| 2002/0158006 A1 | 10/2002 | Thomas | |
| 2005/0279676 A1* | 12/2005 | Izzy | B01D 35/04 210/87 |
| 2008/0173578 A1 | 7/2008 | Mckenzie | |
| 2010/0258493 A1 | 10/2010 | Kindkeppel et al. | |
| 2010/0263339 A1* | 10/2010 | Steins | B01D 46/0024 55/337 |
| 2019/0030470 A1* | 1/2019 | Straussberger | B01D 35/30 |
| 2019/0308125 A1* | 10/2019 | Neef | B01D 27/08 |

OTHER PUBLICATIONS

First Office Action issued for Chinese Patent Application No. CN 2016800450782, dated Jun. 20, 2019, including translation, 11 pages.

* cited by examiner

AIR FILTER ARRANGEMENT

CROSS-REFERENCE TO RELATED APPLICATIONS

The application is a National Stage of PCT Application No. PCT/US2016/046564, filed Aug. 11, 2016, which claims priority to U.S. Provisional Patent Application No. 62/209,162, entitled "AIR FILTER. ARRANGEMENT," filed on Aug. 24, 2015. The contents of both applications are incorporated herein by reference in their entirety and for all purposes.

TECHNICAL FIELD

The present application relates to filtration systems.

BACKGROUND

Internal combustion engines generally combust a mixture of fuel (e.g., gasoline, diesel, natural gas, etc.) and air. Prior to entering the engine, intake air is typically passed through an air filtration system having a filter element to remove contaminants (e.g., particulates, dust, water, etc.) from the intake air prior to delivery to the engine. The contaminants, if allowed to pass into the engine, can cause damage to and potential failure of the engine. The filter element typically includes filter media. As the air passes through the filter media, the filter media removes at least a portion of the contaminants in the fluid. The filter element is sealed against the filtration system housing to prevent air bypassing the filter element. FIG. 1 shows two traditional sealing mechanisms between a filter element and a filter housing. As shown in FIG. 1, the filter element can seal against a housing wall 102 via a radial seal member 104 that presses radially against an inner surface of the housing wall, an axial seal member 106 that presses axially against an axial end of the housing wall 102, or a combination of both sealing mechanisms.

The filter element requires periodic replacement. As the filter element filters the air, the filter media separates and traps a portion of the contaminant in the air. The trapped contaminant increases the restriction of the filtration system, thereby increasing the pressure drop caused by the filtration system. After a threshold amount of contaminant is trapped, the pressure drop caused by the filter element becomes too large for the engine to operate efficiently. At or before this time, the filter element should be replaced. To ensure proper engine operation and equipment safety, the proper replacement filter element should be installed into the filtration system housing. If the wrong type of filter element (e.g., a non-approved filter element) is placed in the filtration system, an undesirable amount of contaminant may pass through the filtration system and into the engine, thereby increasing the risk of damage to the engine. By way of example, non-approved filter elements may utilize different sealing mechanisms than the approved, original type of filter element. The different sealing mechanism can use an alternative sealing surface of the housing. For example, if the approved filter element utilizes an axial seal, the non-approved filter element may utilize a radial seal. Similarly, if the approved filter element utilizes a radial seal, the non-approved filter element may utilize an axial seal. These alternative sealing surfaces of the housing may not be controlled and inspected by the original manufacturer. Thus, the different sealing mechanisms may not provide an adequate seal.

SUMMARY

One example embodiment relates to a filtration system. The filtration system includes a filter housing and a removable filter element positioned within the filter housing. The filtration system further includes at least one surface irregularity on a portion of a surface of the filter housing that prevents a seal from being formed over the portion of the surface.

Another example embodiment relates to a filtration system housing. The filtration system housing includes a filter housing body forming an inner compartment structured to receive a filter element. The filtration system housing further includes a housing cover removably coupled to the housing body. The filtration system housing includes at least one surface irregularity on a portion of a surface of the filter housing body that prevents a seal from being formed over the portion of the surface.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, filter housings that have housing wall surface irregularities are described. The surface irregularities are positioned on the inner walls of the housings and/or axial ends of the housing walls. The surface irregularities may comprise, for example, grooves, ribs, bumps, and the like. The surface irregularities provide an engine integrity protection (EIP) feature by preventing non-approved replacement filter elements (and therefore filter elements that may not have properly designed sealing mechanism) from forming seals against alternative sealing surfaces the housing wall inner surfaces or axial ends. For example, if the approved filter element forms an axial seal with the filtration system housing, the surface irregularities can be positioned to prevent filter elements that are designed to form radial seals with the housing from being installed in the filtration system. Similarly, if the approved filter element forms a radial seal with the housing, the surface irregularities can be positioned to prevent filter elements that are designed to form axial seals with the housing from being installed in the filtration system.

Figure 1:
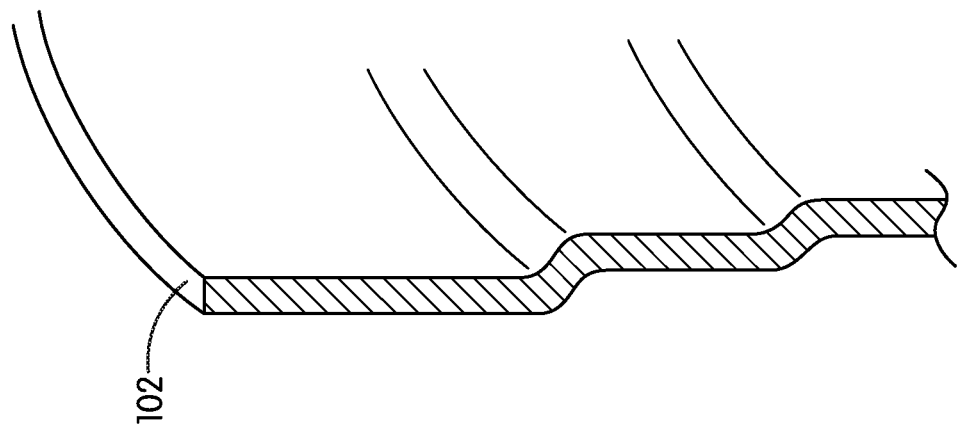
FIG. 1 shows cross-sectional views of a prior-art air filtration system housing and possible filter element seal mechanisms.
Figure 1:
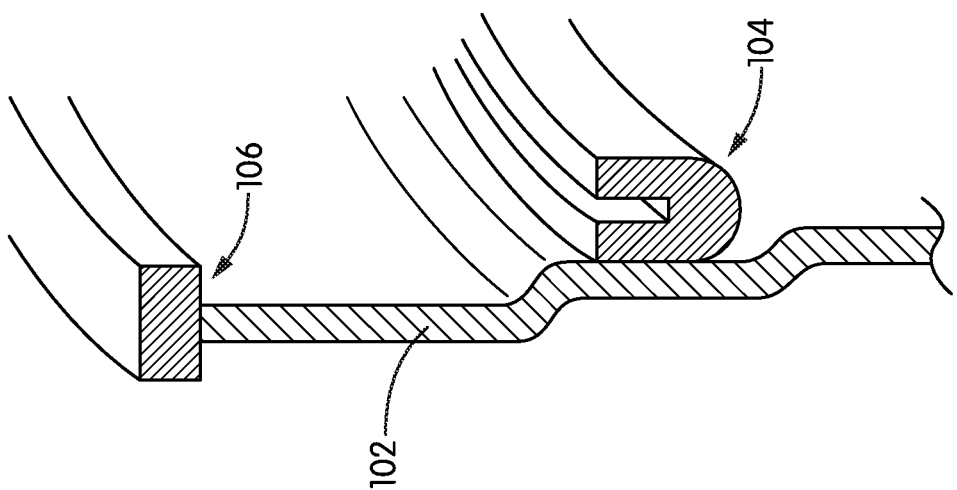
Figure 2:
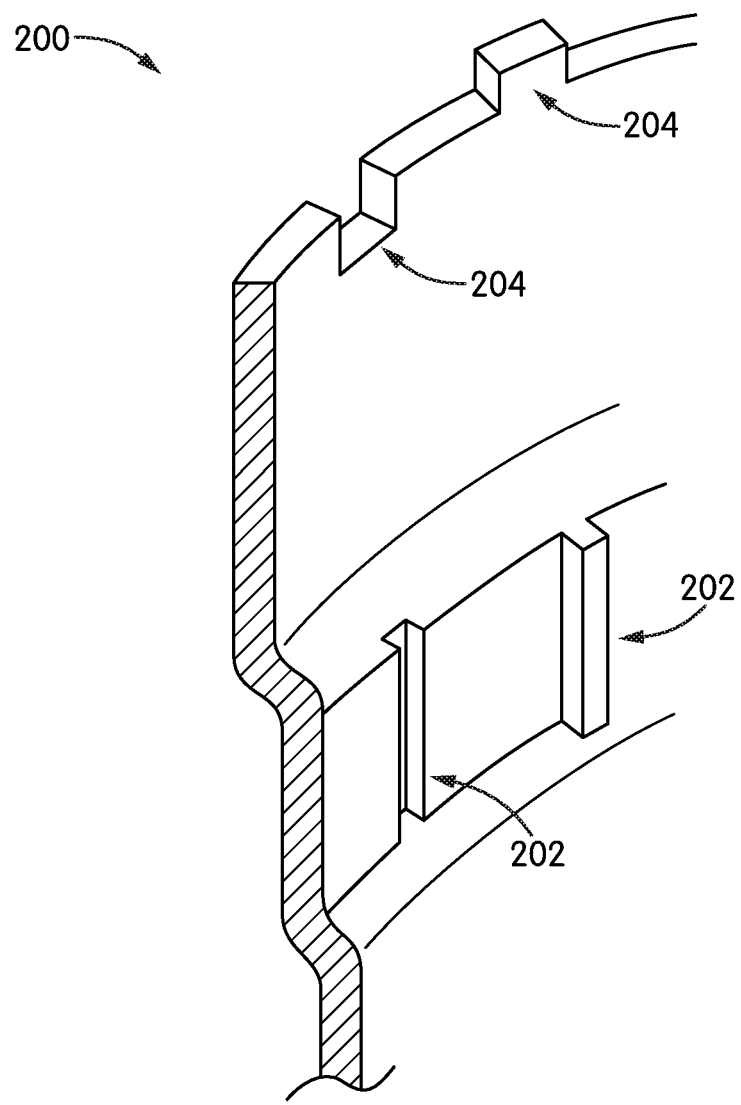
FIG. 2 shows a cross-sectional view of an air filtration system housing according to an example embodiment.

Referring to FIG. 2, a cross-sectional view of a housing 200 of an air filtration system is shown according to an example embodiment. The housing 200 demonstrates the general concept, which is described in further detail below with respect to FIGS. 3 through 12. The housing 200 is a modified version of the housing 102 of FIG. 1. The housing 200 includes surface irregularities that prevent seals from being formed against the housing 200 by potential non-approved replacement filter cartridges. Specifically, the housing 200 includes radial surface irregularities 202 positioned on an inner wall of the housing 200. The radial surface irregularities 202 may comprise, for example, ribs, notches, grooves, bumps, or the like. The radial surface irregularities 202 prevent a radial seal from being formed on the inner wall of the housing 200 at the location of the radial surface irregularities 202. The housing 202 also includes axial surface irregularities 204 positioned on an axial end of the housing 200. The axial surface irregularities 204 may comprise, for example, protrusions, notches, grooves, bumps, or the like. The axial surface irregularities 204 prevent an axial seal from being formed on an axial end of the housing 200 at the location of the axial surface irregularities 204. Accordingly, the surface irregularities 202 and 204 can be used to prevent filter elements with non-approved sealing mechanisms from being installed within the housing 200. For example, if the approved filter element forms an axial seal with the filtration system housing 200, the radial surface irregularities 202 can be positioned to prevent non-approved filter elements that are designed to form radial seals with the housing 200 from properly functioning within the housing 200. Similarly, if the approved filter element forms a radial seal with the housing 200, the axial surface irregularities 204 can be used to prevent non-approved filter elements that are designed to form axial seals with the housing 200 from properly functioning within the housing 200.

Figure 3:
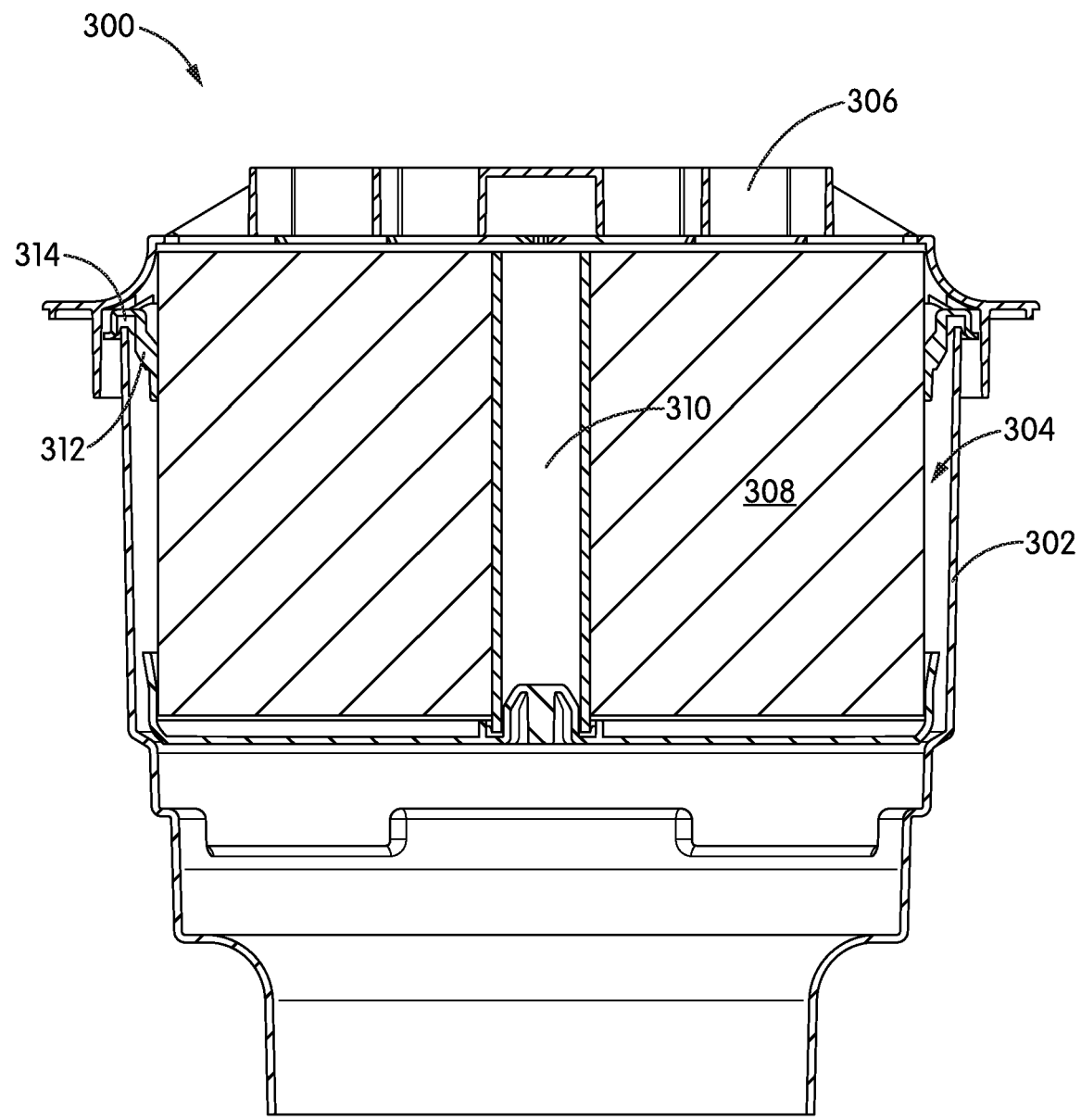
FIG. 3 shows a cross-sectional view of an air filtration system according to another example embodiment.

Referring to FIG. 3, a cross-sectional view of an air filtration system 300 is shown according to an example embodiment. The air filtration system 300 includes a filter housing 302 and a replaceable filter element 304. The replaceable filter element 304 is secured within the filter housing 302 by a cover 306. The filter element 304 includes filter media 308 surrounding a central support core 310. In some arrangements, the filter media 308 is a wound filter media. The filter element 304 includes a circumferential ring 312 that is sealed against the filter media 308. The circumferential ring 312 includes an axial seal member 314. The axial seal member 314 forms an axial seal with an axial end surface of the housing 302. In some arrangements, the axial seal member 314 is held in a compressed state against the axial end surface of the housing 302 when the cover 306 is secured to the housing 302.

The replaceable filter element 304 is an authorized filter element. As such, the replaceable filter element 304 is configured to seal against the housing 302 and remove an adequate amount of contaminant from air being filtered through the filtration system 300. A technician servicing the filtration system 300 may attempt to fit a non-authorized filter element, such as a filter element that is configured to form a radial seal with the housing 302, into the housing 302. To prevent the non-authorized filter element that forms a radial seal with the housing 302 from being installed into the housing 302, the housing 302 includes surface irregularities along an inner wall of the housing 302. The surface irregularities may comprise, for example, ribs, notches, grooves, bumps, or a combination thereof. The surface irregularities prevent a radial seal from being formed on the inner wall of the housing 302 at the location of the radial surface irregularities. Specific arrangements of the surface irregularities are described in further detail below with respect to FIGS. 4 through 7.

Figure 4:
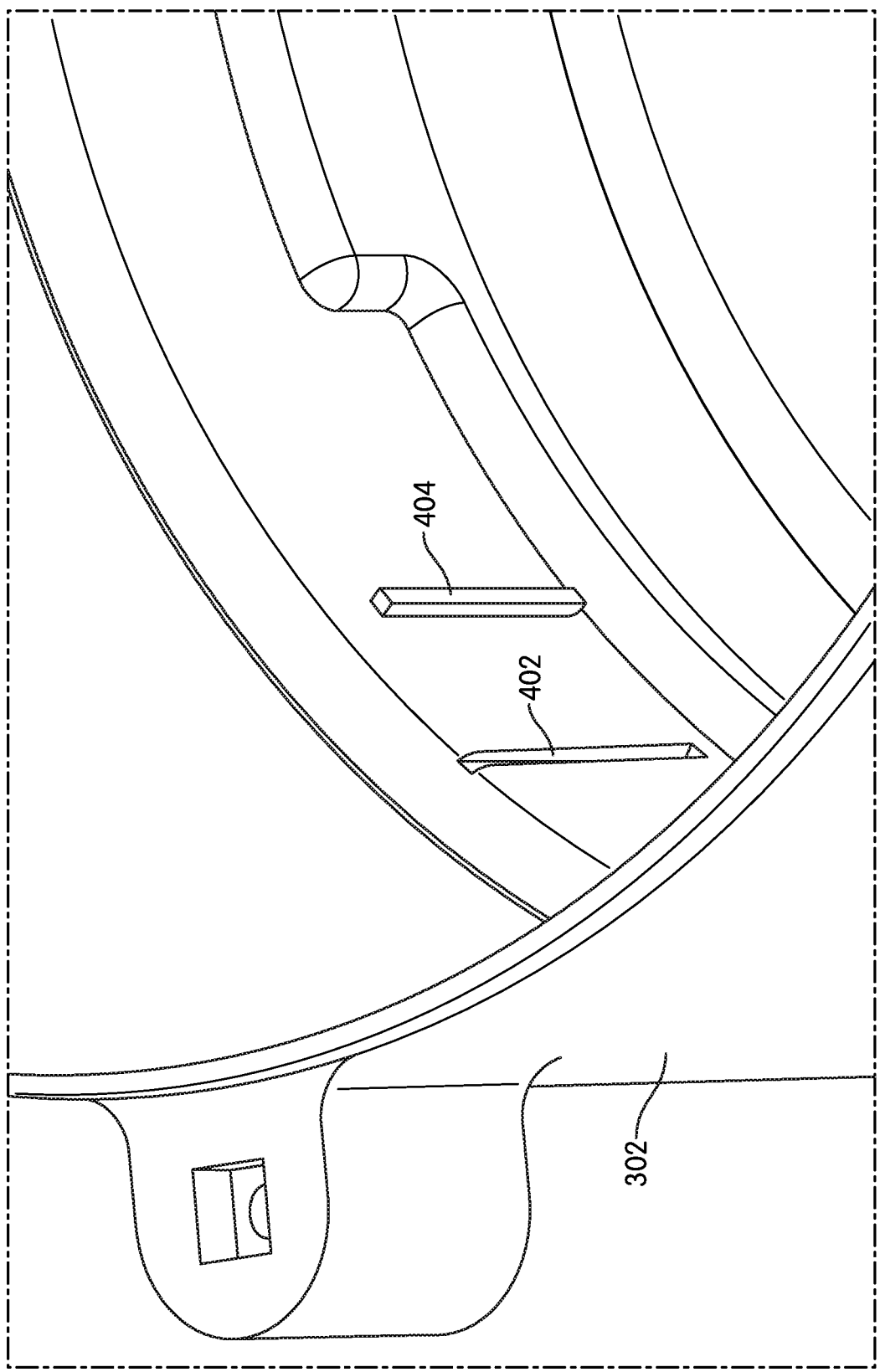
FIGS. 4 through 7 show various configurations of surface irregularities of the housing of the air filtration system of FIG. 3.
Figure 5:
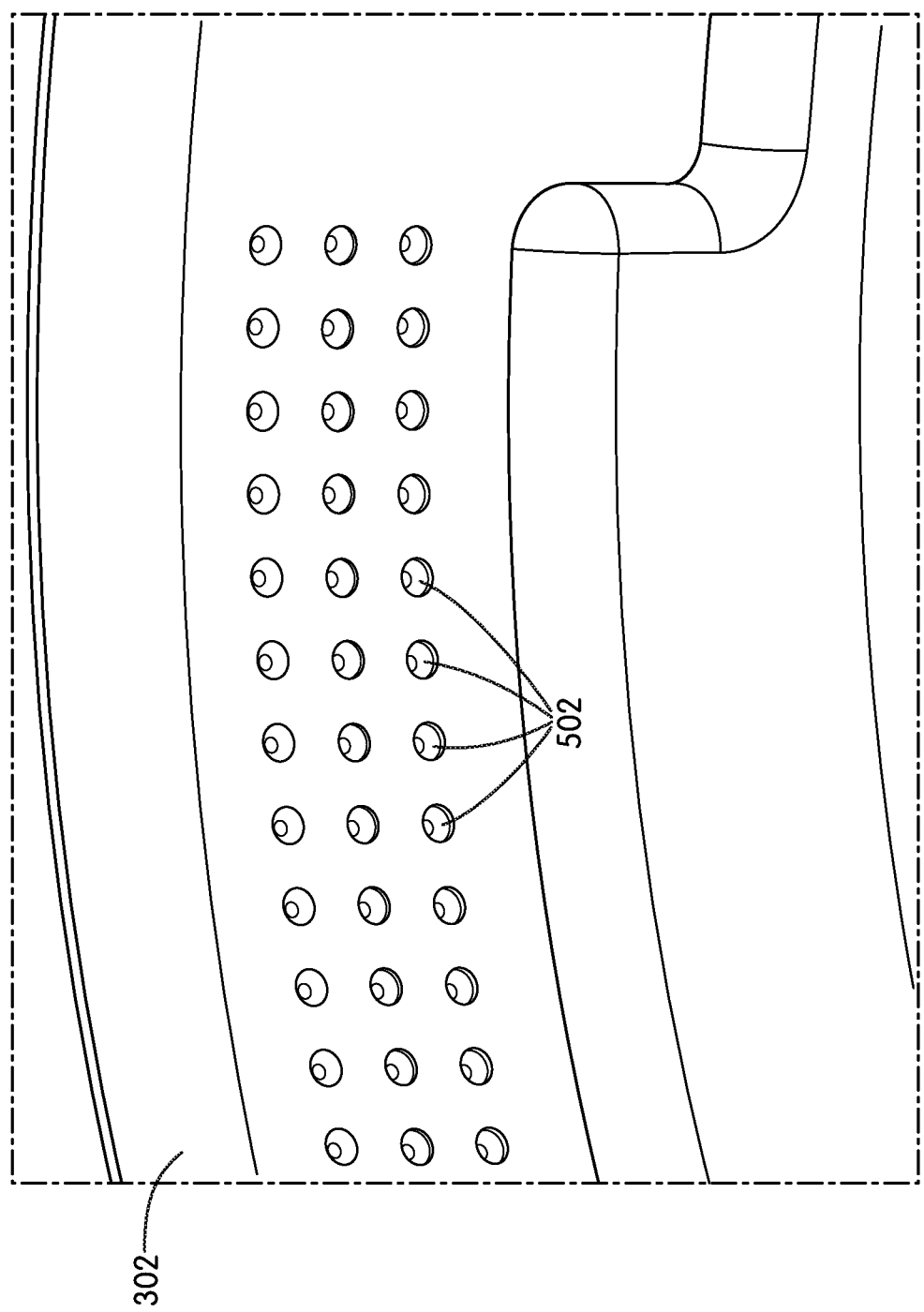
Figure 6:
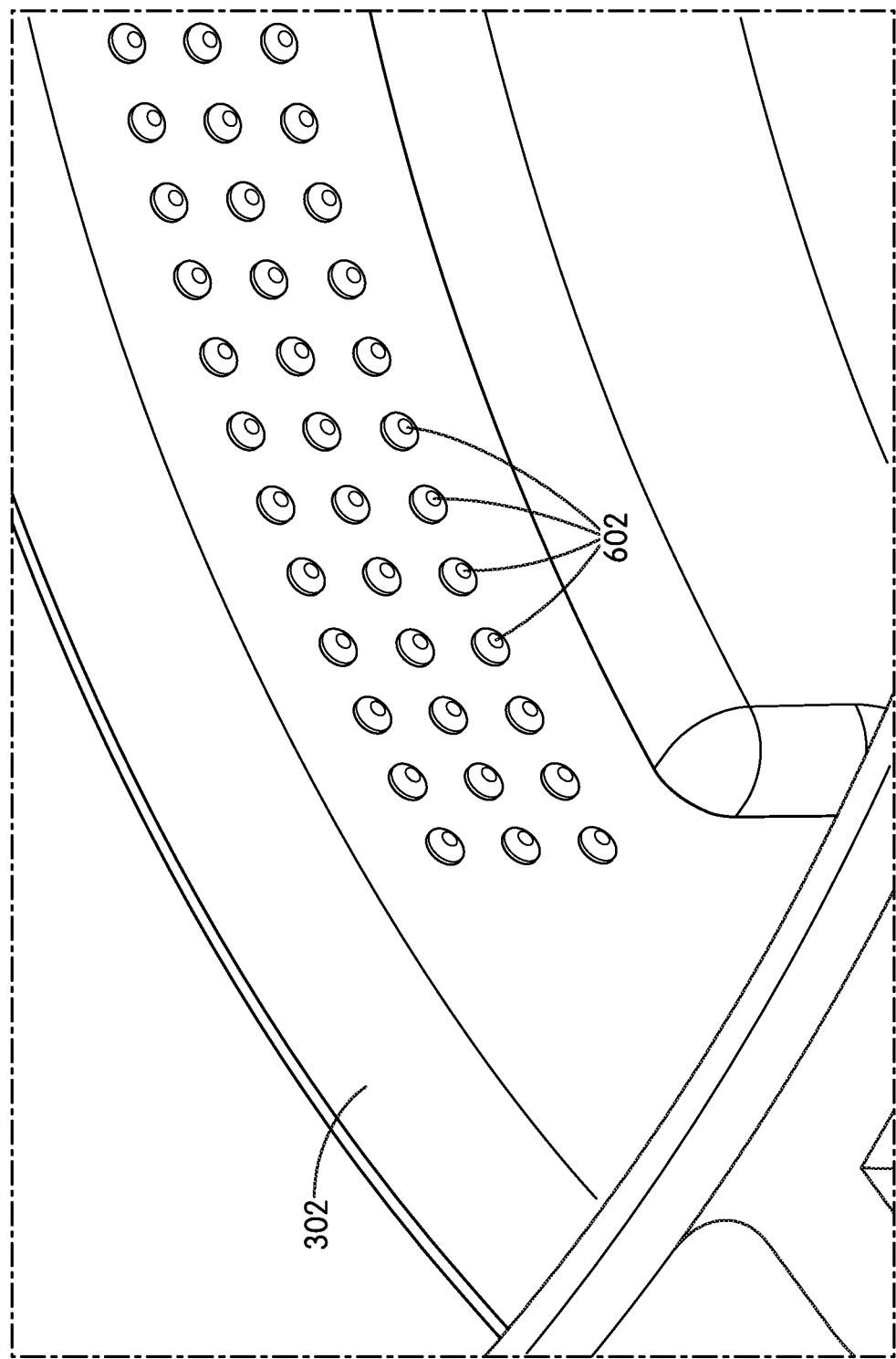
Figure 7:
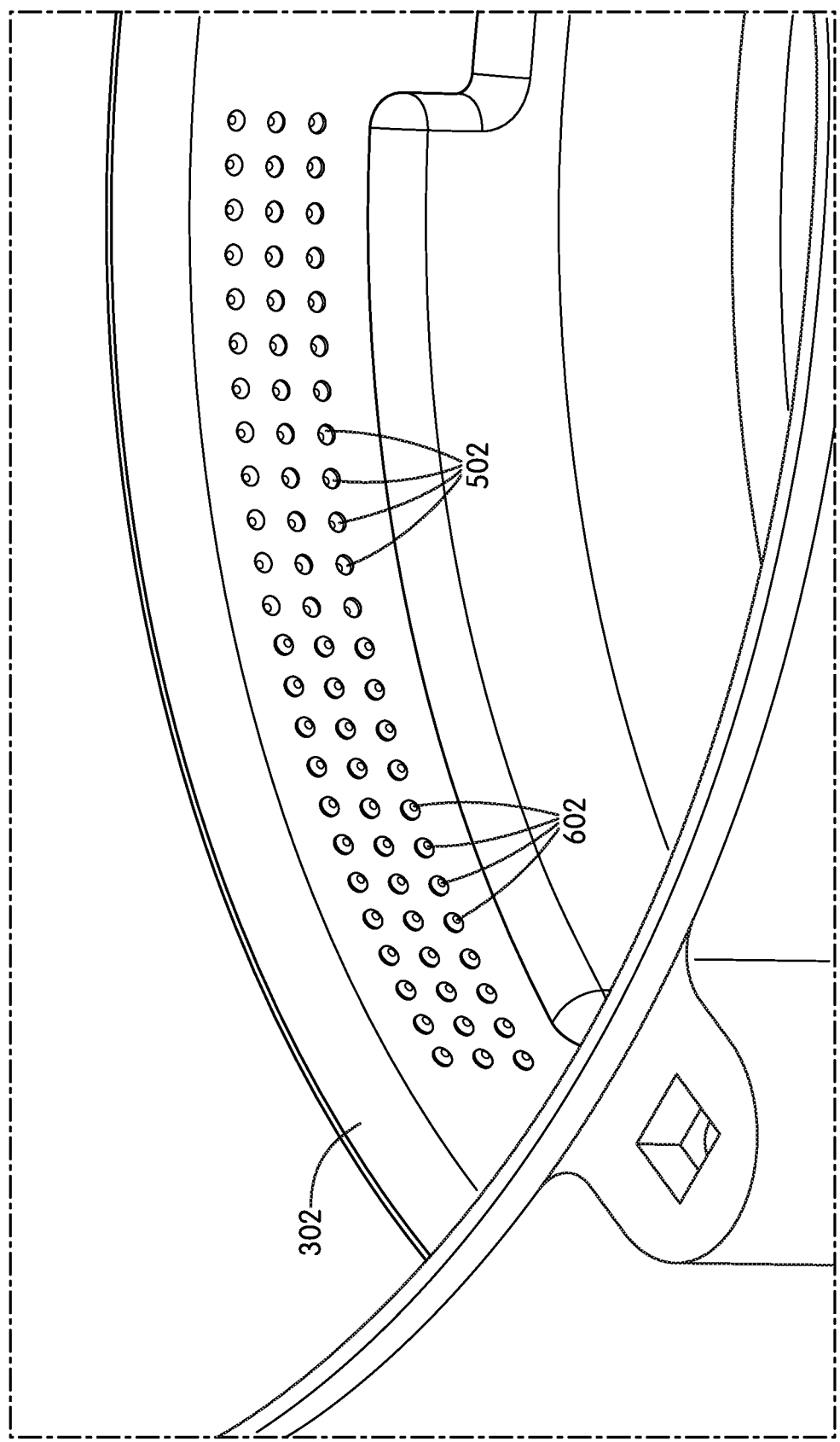

In some arrangements, as shown in FIG. 4, the surface irregularities of the housing 302 include notches 402 and ribs 404. The notches 402 and ribs 404 prevent a radial seal from being formed over the notches 402 and ribs 404 and against the housing 302. Although shown as including both notches 402 and ribs 404, the housing 302 can include only notches 402 or only ribs 404. In other arrangements, as shown in FIG. 5, the surface irregularities of the housing 302 include a plurality of pockets 502. The pockets 502 form blind holes in the housing 302. The pockets 502 prevent a radial seal from being formed over the pockets 502 and against the housing 302. In further arrangements, as shown in FIG. 6, the surface irregularities of the housing 302 include a plurality of bumps 602. The bumps 602 prevent a radial seal from being formed over the bumps 602 and against the housing 302. In still further arrangements, as shown in FIG. 7, the surface irregularities of the housing 302 include a plurality of pockets 502 and a plurality of bumps 602. The pockets 502 and bumps 602 prevent a radial seal from being formed over the pockets 502 and bumps 602 and against the housing 302. In additional arrangements, the surface irregularities of the housing 302 can include any combination of notches 402, ribs 404, pockets 502, and bumps 602.

Figure 8:
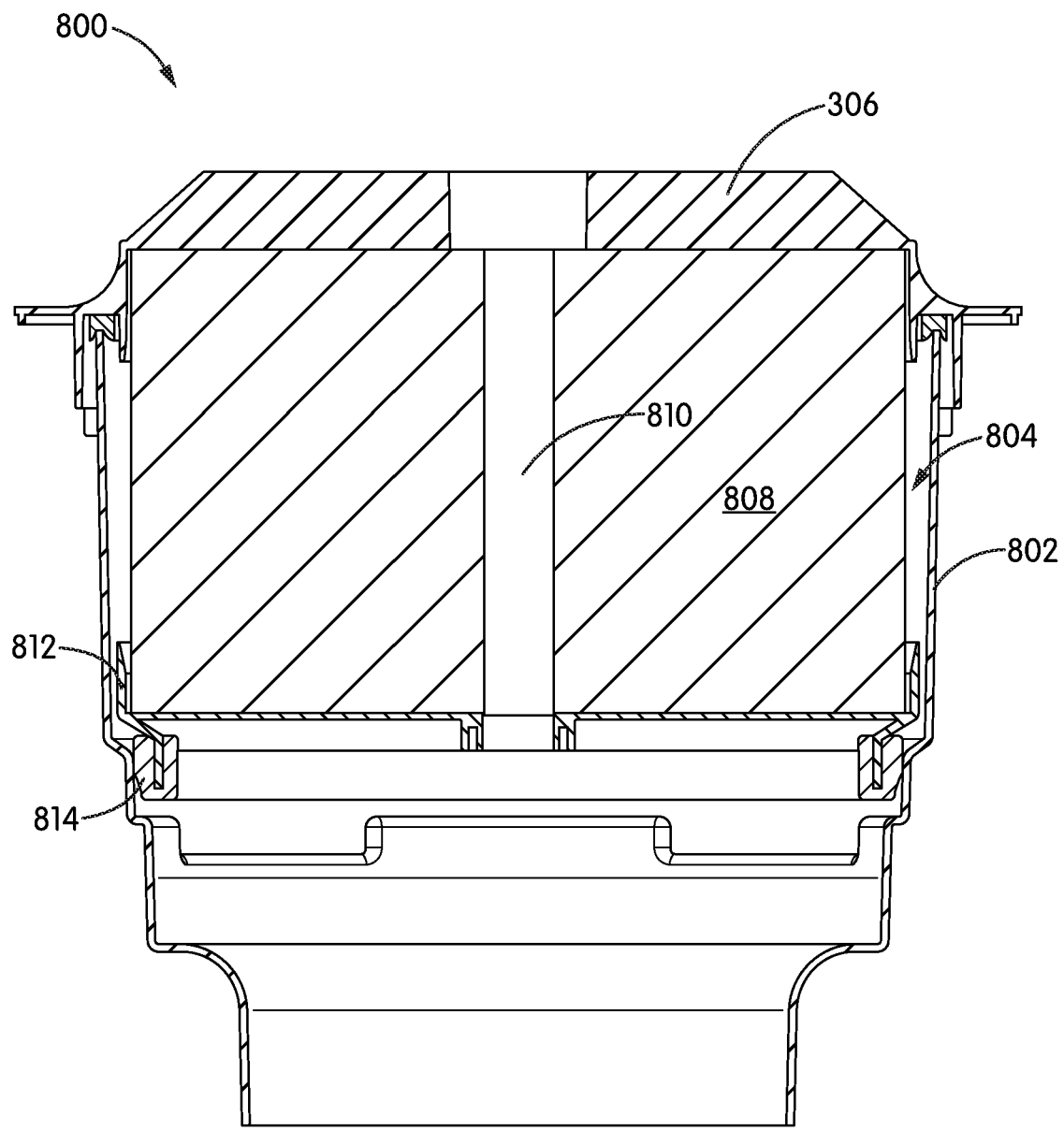
FIG. 8 shows a cross-sectional view of an air filtration system according to a further example embodiment.

FIG. 8 is a cross sectional view of an air filtration system 800 according to an example embodiment. The filtration system 800 is similar to the filtration system 300. The air filtration system 800 includes a filter housing 802 and a replaceable filter element 804. The replaceable filter element 804 is secured within the filter housing 802 by a cover 806. The filter element 804 includes filter media 808 surrounding a central support core 810. In some arrangements, the filter media 808 is a wound filter media. The filter element 804 includes a circumferential ring 812 that is sealed against the filter media 808. The circumferential ring 812 includes a radial seal member 814. The radial seal member 814 forms a radial seal with an inner wall of the housing 802. In some arrangements, the radial seal member 814 is held in a compressed state against the inner wall of the housing 802 when the cover 806 is secured to the housing 802.

The replaceable filter element 804 is an authorized filter element. As such, the replaceable filter element 804 is configured to seal against the housing 802 and remove an adequate amount of contaminant from air being filtered through the filtration system 800. A technician servicing the filtration system 800 may attempt to fit a non-authorized filter element, such as a filter element that is configured to form an axial seal with the housing 802, into the housing 802. To prevent the non-authorized filter element that forms an axial seal with the housing 802 from being installed into the housing 802, the housing 802 includes surface irregularities along an axial end of the housing 802. The surface irregularities may comprise, for example, ribs, notches, grooves, bumps, or a combination thereof. The surface irregularities prevent an axial seal from being formed on the axial end of the housing 802 at the location of the surface irregularities. Specific arrangements of the surface irregularities are described in further detail below with respect to FIGS. 9 through 12.

Figure 9:
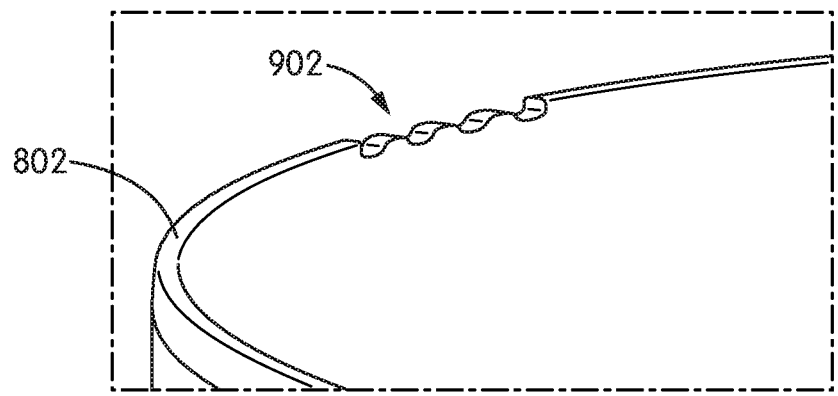
FIGS. 9 through 12 show various configurations of surface irregularities of the housing of the air filtration system of FIG. 8.
Figure 10:
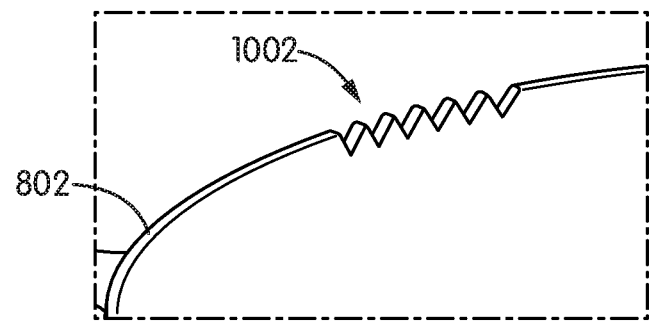
Figure 11:
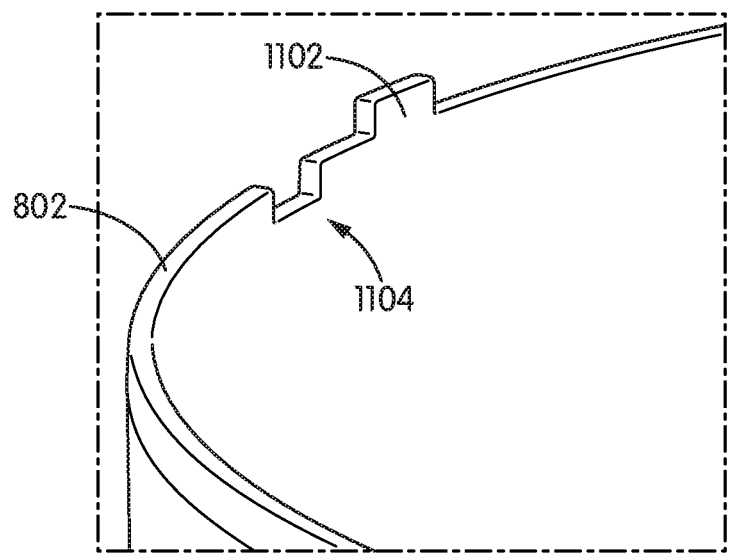
Figure 12:
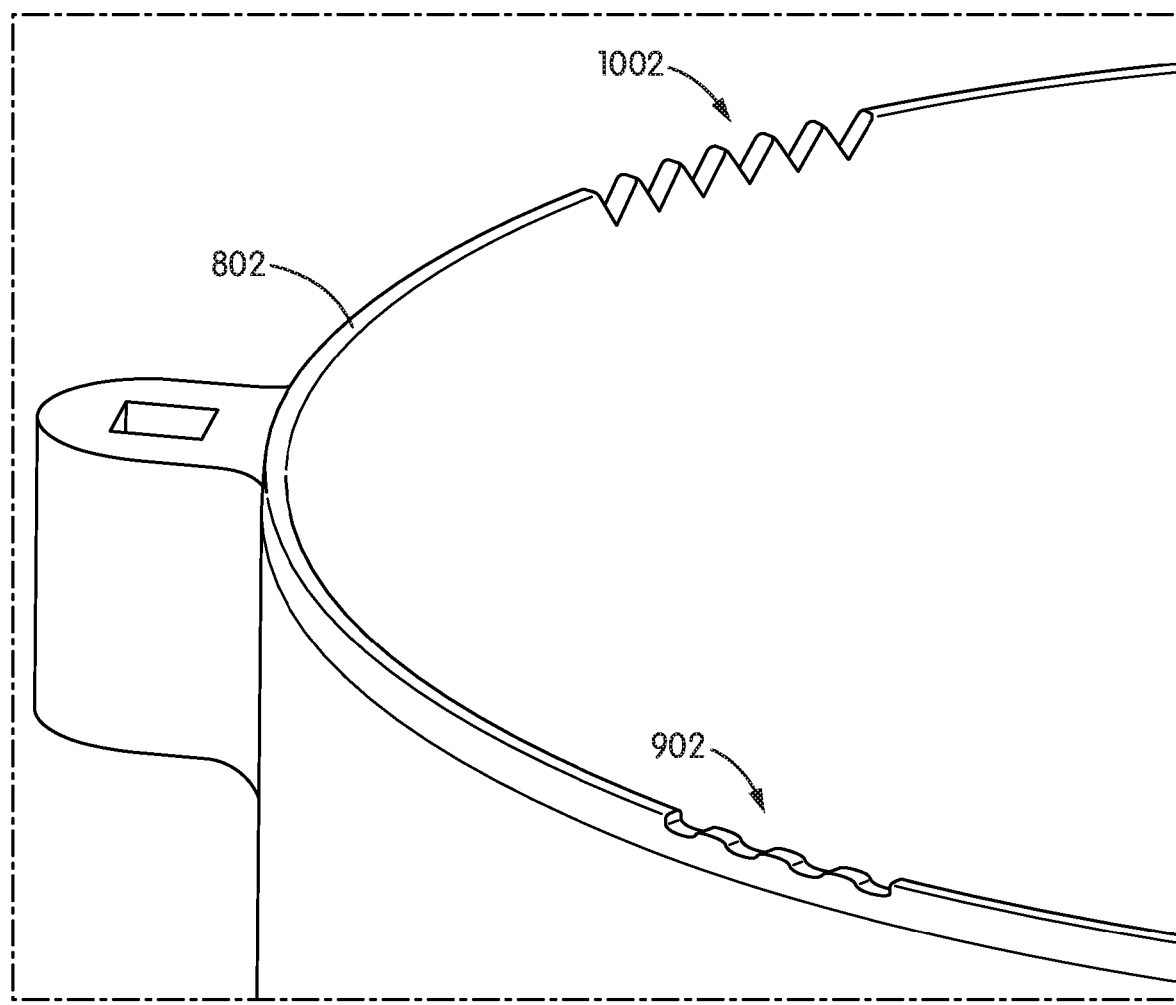

In some arrangements, as shown in FIG. 9, the surface irregularities of the housing 802 include wave-shaped notches 902. The wave-shaped notches 902 prevent an axial seal from being formed over the wave-shaped notches 902 and against the axial end of the housing 802. In other arrangements, as shown in FIG. 10, the surface irregularities of the housing 802 saw tooth shaped notches 1002. The saw tooth shaped notches 1002 prevent an axial seal from being formed over the saw tooth shaped notches 1002 and against the axial end of the housing 802. In further arrangements, as shown in FIG. 11, the surface irregularities of the housing 802 include a projection 1102 and a notch 1104. Although shown as including only one projection 1102 and one notch 1104, it should be understood that the housing 802 can include a plurality of projections 1102 and a plurality of notches 1104. The projection 1102 and the notch 1104 prevent an axial seal from being formed over the projection 1102 and the notch 1104 and against the axial end of the housing 802. In still further arrangements, as shown in FIG. 12, the surface irregularities of the housing 802 sections of wave-shaped notches 902 and sections of saw tooth shaped notches 1002. The sections of wave-shaped notches 902 and the sections of saw tooth shaped notches 1002 prevent an axial seal from being formed over the sections of wave-shaped notches 902 and the sections of saw tooth shaped notches 1002 and against the housing 802. In additional arrangements, the surface irregularities of the housing 802 can include any combination of wave-shaped notches 902, saw tooth shaped notches 1002, projections 1102, and notches 1104.

The above-described filter housings that have housing wall surface irregularities provide EIP features to the filtration systems. The surface irregularities prevent non-approved replacement filter elements from forming seals against the housing wall inner surfaces or axial ends. Accordingly, the surface irregularities prevent proper functioning of the non-approved replacement filter elements thereby discouraging the use of the non-approved replacement filter elements in each filtration system. Although described in the context of an air filtration system, the same or similar seal prevention mechanisms (i.e., the housing surface irregularities) can be applied to other types of filtrations systems, such as fuel filtration systems, lubricant filtration systems, water filtration systems, hydraulic fluid filtration systems, and the like.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system comprising:
    a filter housing;
    a removable filter element positioned within the filter housing;
    a first at least one surface irregularity on a portion of an axial end surface of the filter housing that prevents an axial seal from being formed over the portion of the axial end surface; and
    a second at least one surface irregularity on a portion of an inner wall surface of the filter housing that prevents a radial seal from being formed over the portion of the inner wall surface.

2. The filtration system of claim 1, wherein:
    the removable filter element is an approved filter element; and
    the removable filter element, when positioned within the filter housing, forms a radial seal with the portion of the inner wall surface of the filter housing.

3. The filtration system of claim 1, wherein the first at least one surface irregularity includes at least one of a notch, a projection, a rib, a groove, a bump, or a pocket.

4. The filtration system of claim 1, wherein:
    the removable filter element is an approved filter element; and
    the removable filter element includes a axial seal member that forms a seal between the removable filter element and the axial end surface of the filter housing.

5. A filtration system housing comprising:
    a filter housing body forming an inner compartment structured to receive a filter element;
    a housing cover removably coupled to the filter housing body;
    a first at least one surface irregularity on a portion of an axial end surface of the filter housing body that prevents an axial seal from being formed between the housing cover and the portion of the axial end surface; and
    a second at least one surface irregularity on a portion of an inner wall surface of the filter housing body that prevents a radial seal from being formed over the portion of the inner wall surface when the filter element is positioned within the filter housing body.

6. The filtration system housing of claim 5, wherein the first at least one surface irregularity includes at least one of a notch, a projection, a rib, a groove, a bump, or a pocket.

7. The filtration system housing of claim 5, wherein the filter element includes a first seal member that forms a first seal between the filter element and the filter housing body at a location of the filter housing body, the location being different from the axial end surface.

8. A filtration system comprising:
a filter housing;
a removable filter element positioned within the filter housing;
a first surface irregularity on a portion of a surface of the filter housing that prevents a seal from being formed over the portion of the surface; and
a second surface irregularity on a portion of an axial end surface of the filter housing that prevents an axial seal from being formed over the axial end surface,
wherein the surface of the filter housing is an inner wall surface of the filter housing, and
wherein the first surface irregularity prevents a radial seal from being formed over the portion of the surface.

* * * * *